Aug. 22, 1967 JAMES E. WEBB 3,337,812
ADMINISTRATOR OF THE NATIONAL AERONAUTICS AND SPACE ADMINISTRATION
CIRCULATOR HAVING QUARTES WAVELENGTH RESONANT POST AND PARAMETRIC AMPLIFIER CIRCUITS UTILIZING THE SAME
Filed March 15, 1965

INVENTOR
ROBERT C. CLAUSS
BY
ATTORNEYS 3,337,812
CIRCULATOR HAVING QUARTER WAVELENGTH RESONANT POST AND PARAMETRIC AMPLIFIER CIRCUITS UTILIZING THE SAME

James E. Webb, Administrator of the National Aeronautics and Space Administration, with respect to an invention of Robert C. Clauss, Los Angeles, Calif.

Filed Mar. 15, 1965, Ser. No. 440,036
6 Claims. (Cl. 330—61)

The invention described herein was made in the performance of work under a NASA contract and is subject to the provisions of Section 305 of the National Aeronautics and Space Act of 1958, Public Law 85–568 (72 Stat. 435; 42 U.S.C. 2457).

This invention relates to electromagnetic wave transmission line circulators and, more particularly, to improvements therein.

Generally, a circulator is a three-port device in which energy introduced at one port circulates only to a second port, while energy introduced at the second port circulates only to a third port. The third port is connected to the first port, but is isolated from the second port. Circulation, namely, the preferred direction of energy transmission, is achieved by the directional properties of the interaction between a magnetized ferrite material which is centrally located within the circulator and the transmitted microwave energy.

The use of circulators to control the directional characteristics of transmitted energy is well known. For example, circulators have been used to simultaneously connect a single antenna to a receiver and a transmitter, with the circulator controlling the flow of energy from the transmitter to the antenna, and from the latter to the receiver. Circulators have also been used in conjunction with maser amplifiers as well as parametric amplifiers which are employed to amplify microwave signals in the kilomegacycle frequency range. However, most prior art circulators are relatively large and bulky in size, introducing undesirable noise and losses in the amplified microwave energy.

The large size of prior art circulators is particularly disadvantageous when used together with several maser amplifiers, each one of which needs be placed in a cooling tank to reduce its temperature so that the maser phenomena may take place. Presently known circulators are too large to be placed together with the maser amplifiers in the cooling tank. Thus, the various amplifiers are generally connected to external circulators by means of relatively long transmission lines which contribute to losses of amplified energy as well as increase the noise therein. Similar losses and noise occur when several stages of parametric amplifiers are intercoupled by prior art circulators.

Accordingly, it is an object of the present invention to provide a novel circulator which greatly minimizes disadvantages of prior art circulators.

Another object of the present invention is the provision of a novel circulator adapted to incorporation within a maser amplifier structure.

Yet it is another object of the present invention to provide a circulator with dielectric loading so that the circulator is particularly adapted to be incorporated as an integral part of maser cascaded amplifiers and/or negative resistance type amplifiers.

A further object of the present invention is the provision of a novel circulator having a resonant structure within which amplifying means of negative resistance type amplifiers may be incorporated so that loss of energy and noise problems between the circulator and such amplifiers are substantially eliminated.

These and other objects are achieved in an arrangement wherein a circulator having a ferromagnetic member and adapted to be subjected to an external field includes resonant stubs which are placed within the housing adjacent the ferromagnetic member. The magnetic field causes the permeability of the ferromagnetic member at radio frequencies to be a function of propagation direction. The resonant stubs which are coupled to waveguide sections which define microwave signal ports are dielectrically loaded so that the overall size of the circulator can be greatly reduced. The reduction in size ideally adapts the circulator to be made a part of a cascaded maser amplifier in which the entire assembly is cryogenically cooled. Also, the circulator is particularly advantageous when used with parametric or tunnel diode amplifiers, since the resonant stubs may be used in conjunction with a varactor or tunnel diode, thus incorporating the amplifier within the circulator.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

Figure 1:
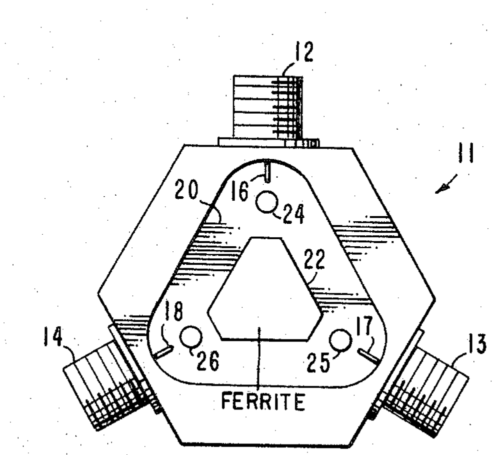
FIGURE 1 is a top sectional view of the resonant circulator of the present invention.

Reference is now made to FIGURE 1 which is a top view of a three-port circulator 11, having coaxial connectors 12, 13 and 14 for coupling the circulator to external signal circuits. Center conductors 16, 17 and 18 of connectors 12, 13 and 14 respectively, are shown extending into the central housing 20 of the circulator 11. Within the housing 20 is located a ferromagnetic member 22, such as a ferrite slab or disc, which, due to a magnetic field (not shown) created thereabout, causes its permability to an RF frequency to be a function of propagation direction. Thus, by controlling the magnetic field, energy may be made to propagate in one direction within the housing between ports, with a minimum of signal losses, whereas signals propagating in the opposite direction are highly attenuated.

The novel circulatory of the present invention incorporates resonant posts (one-quarter wavelength conductors) 24, 25 and 26 coupled to the coaxial connectors 12, 13 and 14 respectively, so that microwave energy may be transferred via one of the connectors between an external source and one of the posts. For example, resonant post 24 may be coupled to an external circuit (not shown) connected to connector 12 by capacitively coupling the post to center conductor 16. Similarly, a loop may be used to couple a coaxial line connected to connector 12 to resonant post 24.

Each of the resonant posts 24, 25 or 26 is a conductor having very low loss which may be surrounded, or loaded, by a material having a relatively high dielectric constant. Thus, the actual physical length of each resonant post may be made much shorter than a free space quarter (¼) wavelength of the particular microwave energy which is to be circulated by the circulator 11. Consequently, the height of the circulator can be greatly reduced. Also, by loading the resonant posts with the dielectric material, the posts may be placed closer together without impairing the performance of the circulator. Thus, the minimum diameter of the circulator which is necessary for circulating energy of given frequency is greatly reduced.

As previously explained, the reduction in size of a circulator for controlling the directional transmission characteristics of microwave energy of a particular wavelength or bandwidth is highly desirable, in several different applications of microwave energy. The availability of a miniature circulator is particularly significant in the design and construction of maser amplifier systems. As is well known by those familiar with the art, maser amplifiers are maintained at cryogenic temperatures by placing the maser material and associated circuitry in a cooling tank or dewar. Typical prior art maser amplifier systems include circulators used to control the direction of flow of energy between the various stages of amplification. However, due to their excessive dimensions, the circulators are mounted outside the cooling tank with coaxial connection being used to couple the circulators to the components within the tank. Such maser amplification systems exhibit unavoidable signal losses and noise which are directly attributable to the interconnecting cables which are a must because of the large size of presently known circulators.

However, by using the novel resonant posts hereinbefore described, the size of the circulator (for a given frequency) can be greatly reduced so that the circulator may be a part of the system within the cooling tank. Thus, the coaxial cables interconnecting different amplification stages are eliminated which greatly increases the sensitivity, or signal-to-noise ratio, of the system. In addition, the smallness of the circulator of the present invention which, due to the resonant posts incorporated therein will hereinafter be referred to as the resonant circulator, accounts for its lighter weight and ease of mounting which are highly desirable in applications other than in maser amplification systems.

From the foregoing, it should be appreciated that the reduction in size of the resonant circulator of the present invention is possible due to the dielectric loading of the resonant posts 24, 25 and 26. Such dielectric loading may be advantageously utilized when the resonant circulator is used together with parametric amplifiers or tunnel diode amplifiers. In practice, one of the resonant posts may be used as an active circuit of the amplifier so that together with a negative-resistance element, such as a tunnel diode or varactor, a portion of the circulator forms one of the functional circuits of the parametric amplifier.

Figure 2:
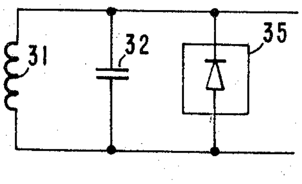
FIGURE 2 is a simplified schematic diagram of a parametric amplifier.

Reference is now made to FIGURE 2 in which a parametric amplifier is schematically diagrammed as comprising an inductor 31 and capacitor 32, connected in parallel to form a resonant tank circuit (at the particular frequency), shunted by a negative resistance type element 35, which is represented by an enclosed diode. The element 35 may comprise a tunnel diode, varactor or similar amplifying medium, used in such amplifiers. According to the teachings of the present invention, any of the resonant posts of the resonant circulator may be designed so that it also performs the functions of the resonant tank circuit of the amplifier, thus reducing the number of required components of any amplifier which may be connected to the circulator.

Figure 3:
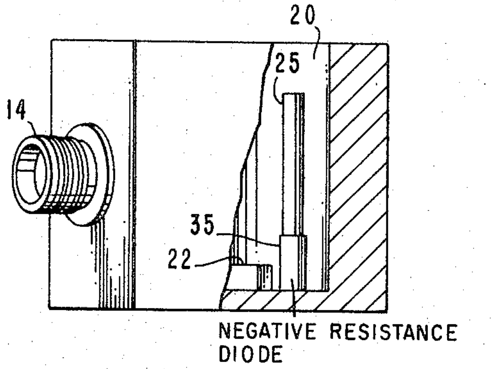
FIGURE 3 is a side view of the circulator with a portion of the external surface removed.

In addition, as seen from FIGURE 3 to which reference is made herein, the element 35 may directly be mounted within the circulator and coupled to one of the resonant posts such as post 25, so that the entire amplifier is housed within the resonant circulator. Thus, all cables for intercoupling the amplifier to the circulator can be eliminated, thereby greatly increasing the mechanical stability of the amplifier. It is thus seen that the resonant post, in addition to contributing to the reduction in size of the circulator, may also be incorporated as part of a negative resistance amplifier, thereby reducing the number of required components and increasing the mechanical stability of the amplifier.

Figure 4:
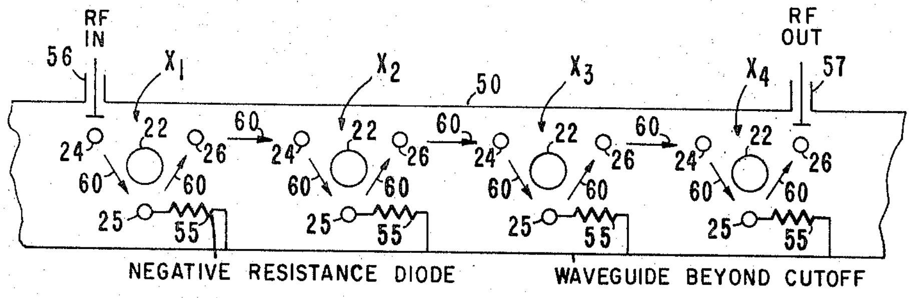
FIGURE 4 is a cross section of multistage amplification arrangement in accordance with the teachings of the invention.

When several amplifiers and circulators are to be used in a series, they may be placed into a waveguide beyond cutoff enclosure. Such an arrangement is diagrammatically shown in FIGURE 4 wherein circulators $X_1$ through $X_4$ are mounted within a waveguide beyond cutoff enclosure 50. Each of the circulators comprise a ferromagnetic member 22 and resonant posts 24, 25 and 26 with a negative resistance element 55 connected to post 25. Microwave energy from an external source is introduced into the waveguide 50 through a coaxial connector 56 which is shown capacitively coupled to resonant post 24 of circulator $X_1$, whereas a coaxial connector 57, capacitively coupled to post 26 of circulator $X_4$, is used to remove the amplified microwave energy.

Coupling between resonators is accomplished by location of circulators in such a manner that one resonant post of one circulator, such as post 26 of circulator $X_1$, is close to one resonant post of another circulator, such as post 24 of circulator $X_2$. An exemplary propagation path of the energy is diagrammed in FIGURE 4 by arrows 60. In this manner, many stages of amplification, each using one resonant circulator, may be cascaded within the waveguide enclosure. Consequently, conventional coaxial lines which are used to interconnect such amplification stages are eliminated, thereby greatly reducing energy losses as well as the cost of constructing a multistage amplification system.

There has accordingly been shown and described, a novel and useful resonant circulator, using resonant posts which are dielectrically loaded so that the overall size of the circulator (for a given microwave frequency) is greatly reduced as compared with prior art devices. The reduced size adapts the circulator for use in maser amplification systems, and other applications where the size of the circulator is of particular significance. In addition, the resonant circulator is ideally suited for negative resistance type amplifiers where the amplifying medium can be incorporated with one of the circulator's resonant posts.

What is claimed is:

1. In a circulator having a plurality of signal ports and a ferromagnetic member centrally positioned within a housing of said circulator and in relation to said plurality of signal ports for controlling the propagation of signals between ports to be in a selected direction as a function of the permeability of said ferromagnetic member which is controlled by an external magnetic field in which said member is locatable, the improvement comprising a plurality of dielectrically loaded resonant posts, each resonant post being positioned within the housing of said circulator between said ferromagnetic member and one of said signal ports and conductively coupled to said one of said signal ports so that signals are transferred between each resonant post and the signal port coupled thereto, whereby the permeability of said ferromagnetic member as controlled by said external field controls the direction of propagation of signals within said circulator between said resonant posts, the effective length of each resonant post being one quarter of the wavelength of the signals.

2. In a circulator having a plurality of signal ports and a ferromagnetic member in a magnetic field, said member being positioned within a housing of said circulator and in relation to said plurality of signal ports for controlling the direction of propagation of radio frequency signals supplied through said signal ports to be in a selected direction as a function of the polarity of said magnetic field, the improvement comprising: coaxial connecting means for transferring said radio frequency signals through said signal ports to and from said circulators; and a plurality of dielectrically loaded conducting resonant posts, each positioned within said housing between said ferromagnetic member and one of said signal ports and conductively coupled to said coaxial connecting means for transferring said radio frequency signals therebetween, the effective length of each post being substantially equal to one-quarter wavelength of said radio frequency signals.

3. In a circulator as recited in claim 2 wherein the physical length of each said resonant post is less than one-quarter wavelength as a function of the dielectric loading thereof.

4. A miniature circulator as recited in claim 3 further including amplifying means of a parametric type amplifier coupled within said circulator to at least one of said dielectrically loaded resonant posts for performing the function of said parametric type amplifier.

5. A multistage amplification system for amplifying microwave energy in a selected bandwidth by a plurality of negative resistance amplifying means comprising a waveguide section beyond cutoff enclosure; means for introducing the microwave energy into said section and for removing amplified microwave energy therefrom; a plurality of negative resistance amplifying means; and a plurality of circulators each including a plurality of quarter wavelength dielectrically loaded resonant posts, one post of each circulator coupled to one of said negative resistance amplifying means, so that microwave energy amplified therein is circulated to a succeeding circulator to be amplified by the negative amplifying means connected thereto.

6. A system for amplifying microwave energy in a selected frequency range in a plurality of cascaded stages comprising a waveguide section beyond cutoff enclosure;

a coaxial input line coupled to said section for providing microwave energy to said section; a coaxial output line coupled to said section for removing amplified microwave energy from said section; a plurality of negative resistance amplifying means couped to said section; and a plurality of circulators cascaded in said section between said coaxial input and output lines, each circulator including a ferromagnetic member and a plurality of quarter wavelength dielectrically loaded resonant posts, one post of each circulator coupled to another of said negative resistance amplifying means, a first post of a first of the cascaded circulators coupled to said coaxial input line, and a last post of a last of the cascaded circulators coupled to said coaxial output line, whereby microwave energy is amplified by the negative resistance amplifying means coupled to the post of each resonator and circulated to a succeeding circulator to be amplified by the negative resistance amplifying means coupled thereto.

References Cited

UNITED STATES PATENTS

| | | | |
|---|---|---|---|
| 3,165,711 | 1/1965 | Drumheller et al. | 333—1.1 |
| 3,229,215 | 1/1966 | La Rosa | 330—4.9 |
| 3,277,399 | 10/1966 | Simon | 333—1.1 |

HERMAN KARL SAALBACH, *Primary Examiner.*

P. L. GENSLER, *Assistant Examiner.*